United States Patent [19]
Irvine et al.

[11] Patent Number: 6,085,975
[45] Date of Patent: Jul. 11, 2000

[54] BARCODE MODULE FOR AN AUTOMATED DATA STORAGE LIBRARY

[75] Inventors: Brian Irvine, Sunnyvale; Kyle F. Dando, San Jose; Stephen Etchison, Boulder Creek; Paul Swan, San Jose, all of Calif.

[73] Assignee: Disc, Inc., Milpitas, Calif.

[21] Appl. No.: 09/291,141

[22] Filed: Apr. 12, 1999

Related U.S. Application Data

[63] Continuation of application No. 09/280,229, Mar. 29, 1999.
[60] Provisional application No. 60/079,843, Mar. 30, 1998.
[51] Int. Cl.[7] .................................................. G06K 15/00
[52] U.S. Cl. ............................................. 235/383; 235/486
[58] Field of Search ................................. 235/380, 383, 235/462.01, 462.13, 492, 487, 488, 475, 479, 486; 369/30, 34, 36

[56] References Cited

U.S. PATENT DOCUMENTS

| | | | |
|---|---|---|---|
| 5,303,214 | 4/1994 | Kulakowski et al. | 369/34 |
| 5,729,464 | 3/1998 | Dimitri | 369/34 X |
| 5,781,367 | 7/1998 | Searle et al. | 369/36 X |
| 5,870,245 | 2/1999 | Kersey et al. | 369/36 X |
| 5,880,452 | 3/1999 | Plesko | 235/472 |
| 5,933,396 | 8/1999 | Hammer et al. | 369/36 |

*Primary Examiner*—Karl D Frech
*Attorney, Agent, or Firm*—Wilson Sonsini Goodrich & Rosati

[57] ABSTRACT

A barcode module for an automated data storage libary is described. More particularly, a barcode module capable of being manipulated by a picker and easily retrofitted to existing data storage libraries is described. The barcode module may be equipped with a network interface capable of receiving high-level commands over a control network from a central control unit and converting the high-level commands into low-level commands used to control the barcode module.

6 Claims, 9 Drawing Sheets

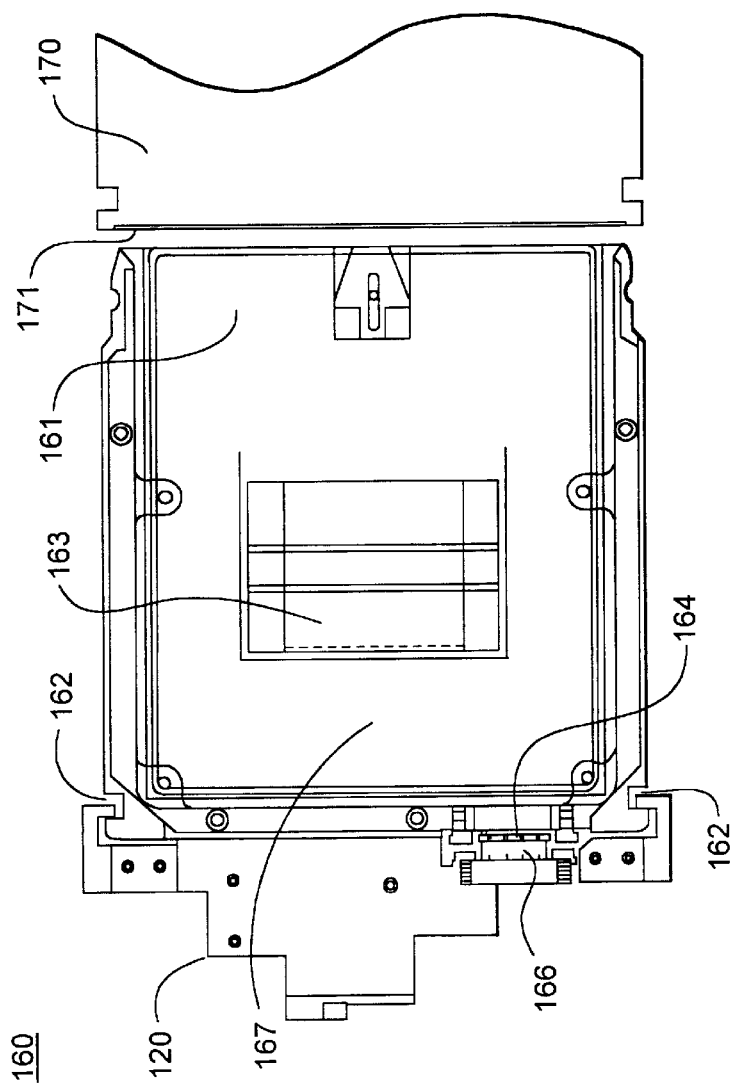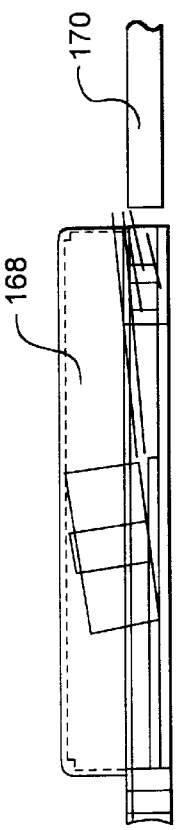
FIG. 5A
FIG. 5B

BARCODE MODULE FOR AN AUTOMATED DATA STORAGE LIBRARY

CROSS-REFERENCE TO RELATED APPLICATIONS

This application is a continuation of the U.S. patent application entitled DISTRIBUTED CONTROL ARCHITECTURE FOR AN AUTOMATED DATA STORAGE LIBRARY, Ser. No. 09/280,229, filed Mar. 29, 1999, and invented by Brian Irvine, Bruce E. Femmel, Kyle F. Dando, and Tuan N. Nguyen, which claims priority to the U.S. Provisional patent application entitled DISTRIBUTED CONTROL ARCHITECTURE FOR AN AUTOMATED DATA STORAGE LIBRARY, Ser. No. 60/079,843, filed Mar. 30, 1998, and invented by Brian Irvine, Bruce E. Femmel, Kyle F. Dando, and Tuan N. Nguyen.

BACKGROUND OF THE INVENTION

1. Field of the Invention

The present invention relates to a barcode module for automated data storage libraries. More particularly, the present invention relates to a barcode module capable of being manipulated by a picker and easily retrofitted to existing data storage libraries

2. Description of Related Art

An automated data storage library or autochanger, otherwise known as a data jukebox, allows a host computer to access data on a large number of storage media, such as magneto-optical cartridges or CD-ROMs. A data jukebox typically includes a CCU (Central Control Unit), a picker, drives, a mailbox, and multiple slots to keep the storage media. The CCU receives commands from the host computer and processes the commands to control the picker, the drives, and the mailbox. The picker physically moves the storage media between the drives, the mailbox, and the slots. The drives exchange data with the storage media. The mailbox allows a user to insert or remove storage media into and from the data jukebox.

The CCU controls the motors and sensors required to operate the picker, the drives, the mailbox, and other components. A typical CCU encompasses all hardware and software functions required for these motors and sensors. Host interface control and low-level motion control are all contained in the same monolithic CCU, which often takes the form of a large printed circuit board.

By the nature of motion control, high frequency and high current signals must route through portions of this main board on their way to the motors they control. This places these signals in close proximity to the data paths over which user data travels. Special care must be exercised in the design of such a circuit to minimize or eliminate interference between these two separate functions. Isolation of these regions of the board requires expensive construction of the board itself, or the placement of the high current motor signals on an entirely separate board, which increases complexity and cost. When the motor drive signals are sent to the motors, they must travel across long cables before reaching their destination. These long cables act as an antenna for the transmission of electromagnetic interference, which can be picked up by the sensitive data cables attached to the internal data drives. Moreover, these long cables are frequently specialized and expensive.

In addition, motors are often equipped with incremental encoders for determining their position. The signals from these encoders are typically weak and very high frequency. The cables over which these signals travel back to the control board are susceptible to the noise generated by the high current motor drive signals. This kind of interference with the encoder signals may cause a motor controller to lose the correct position of the motor, which in turn causes error in servo positioning. This can eventually lead to failure of the robotics mechanism to properly handle data cartridges.

The wiring required to carry a multitude of motor control and encoder signals over a long distance through the jukebox is specialized and expensive. For example, custom-fabricated, application-specific flexible circuits must be designed and manufactured for the picker. The complexity and cost of the wiring and interconnects also increases with picker complexity. Furthermore, a significant portion of manufacturing effort is devoted into connecting and checking that each and every connection has been properly made.

Typically, media is inserted through the mailbox, which stores the location of each media. However, loading of the jukebox through the mailbox is slow, as only one piece of media can be loaded at a time. Also, when the cabinet of the jukebox is opened and the slots accessed directly, the location of media may be shuffled and an inventory process must be performed.

To inventory the contents of a jukebox, a machine readable identification tag may be placed on the media. For example, a barcode may be placed on the edge of the media. This allows rapid inventory of the media in a jukebox.

Current barcode readers are integrated with the picker. This means older jukeboxes must be retrofitted in order to take advantage of the barcode reading capabilities. Also, to service the barcode reader means having to service the entire picker.

What is needed is a data jukebox which is less susceptible to electromagnetic interference than current jukeboxes. What is also needed is a data jukebox which has simpler wiring between components than current jukeboxes.

What is needed is a barcode module which can be used with existing jukeboxes and provide barcode functionality.

SUMMARY OF THE INVENTION

The present invention relates to a barcode module for a data jukebox. The barcode module comprises a housing capable of being manipulated by a picker and a barcode reader coupled to the housing, the barcode reader capable of reading barcodes found on media cartridges to allow inventory of media cartridges in the data jukebox.

BRIEF DESCRIPTION OF THE DRAWINGS

FIGS. 5A–5C show a top, side, and end views, respectively, of one embodiment of a barcode module of the present invention.

DETAILED DESCRIPTION OF THE INVENTION

The distributed control architecture of the present invention places control functions at the point of application, instead of in a monolithic CCU. This means noise-generating signals are constrained to very short paths where their effect on other functions in the jukebox is minimized. This distributed control architecture thus minimizes or eliminates the need for long, complex, and noisy cables. Because high frequency, high amplitude signals are not routed throughout the jukebox, electrical noise is kept to a minimum. This means greatly reduced interference with critical control signals, as well as a quieter and safer environment for data signals travelling to and from the host. By reducing the path length of cabling, this architecture also reduces the number of interconnects.

For example, the distributed control architecture of the present invention locates a motor controller immediately adjacent to the motor it controls, thus confining drive signals and encoder signals to separate, very short paths. This eliminates a great deal of the electromagnetic interference often found in centralized control systems. The reduced EMI environment makes data paths more robust and dependable.

Each network interface may include an application processor and software to accomplish a specific action such as moving a motor or reading an input signal from a sensor. Some network interfaces may be capable of performing multiple functions. A central network interface associated with the central control unit coordinates actions of all network interfaces on the control network. Any network interface can send a message to any other network interface on the control network.

The central network interface serves as the interpreter of host requests for specific actions. It decodes the commands from the host and issues the appropriate series of network commands at the correct times to any network interfaces in the jukebox which are required to accomplish the host request. The central control node manages any errors or failures reported by the network interfaces.

When library systems increase in size, centralized control configurations fail to function reliably. The distributed control architecture of the present invention solves this problem by greatly facilitating physical expansion of library systems.

Thus, the distributed control architecture of the present invention may be characterized by a set of specialized units working in concert and coordinated by a single controller network interface, along with the definition of the types of network interfaces required to control an automated storage library, the specific functional definitions of these network interfaces, and the command and response protocols among network interfaces.

1. System

Figure 1A:
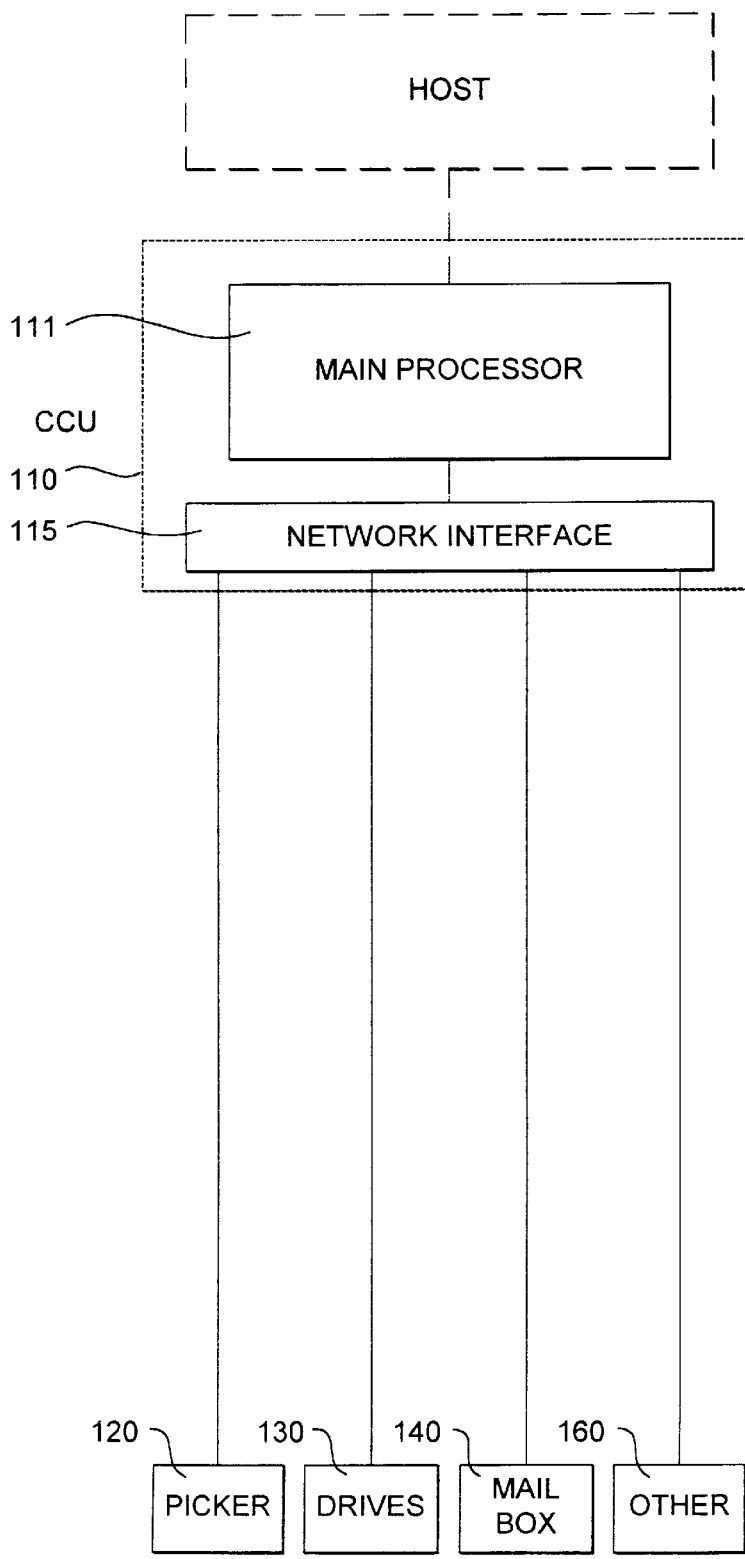
FIG. 1A shows a schematic view of one embodiment of a data jukebox of the present invention.

FIG. 1A shows a schematic view of one embodiment of a data jukebox 100 of the present invention. Jukebox 100 includes a CCU (Central Control Unit) 110. CCU 110 may include a main processor 111 and a central network interface 115. CCU 110 is connected through a control network 116 to a picker 120, drives 130, and a mailbox 140. CCU 110 may be under the control of a host 119. CCU 110 receives requests from host 119, and then processes the request into instructions for the picker 120, drives 130, and mailbox 140. CCU 110 may be connected to host 119 by an RS232 serial connection or any other suitable connection.

Central network interface 115 may be a Neuron™ chip available from Echelon Corp. Control network 116 may use a commercially available networking scheme or protocol, such as Lonworks™ by Echelon Corp., Ethernet™, TCP/IP, ARCNET, USB (Universal Serial Bus), CAN (Controller Area Network) bus, IEEE P1394, or any other suitable networking protocol. Control network 116 may be wired using readily available networking cable, such as twisted pair, RJ-11, RJ-45, or any other suitable standardized cabling. Control network 116 may also be wireless, interconnected through a radiofrequency broadcast or infrared transmission system.

Figure 1B:
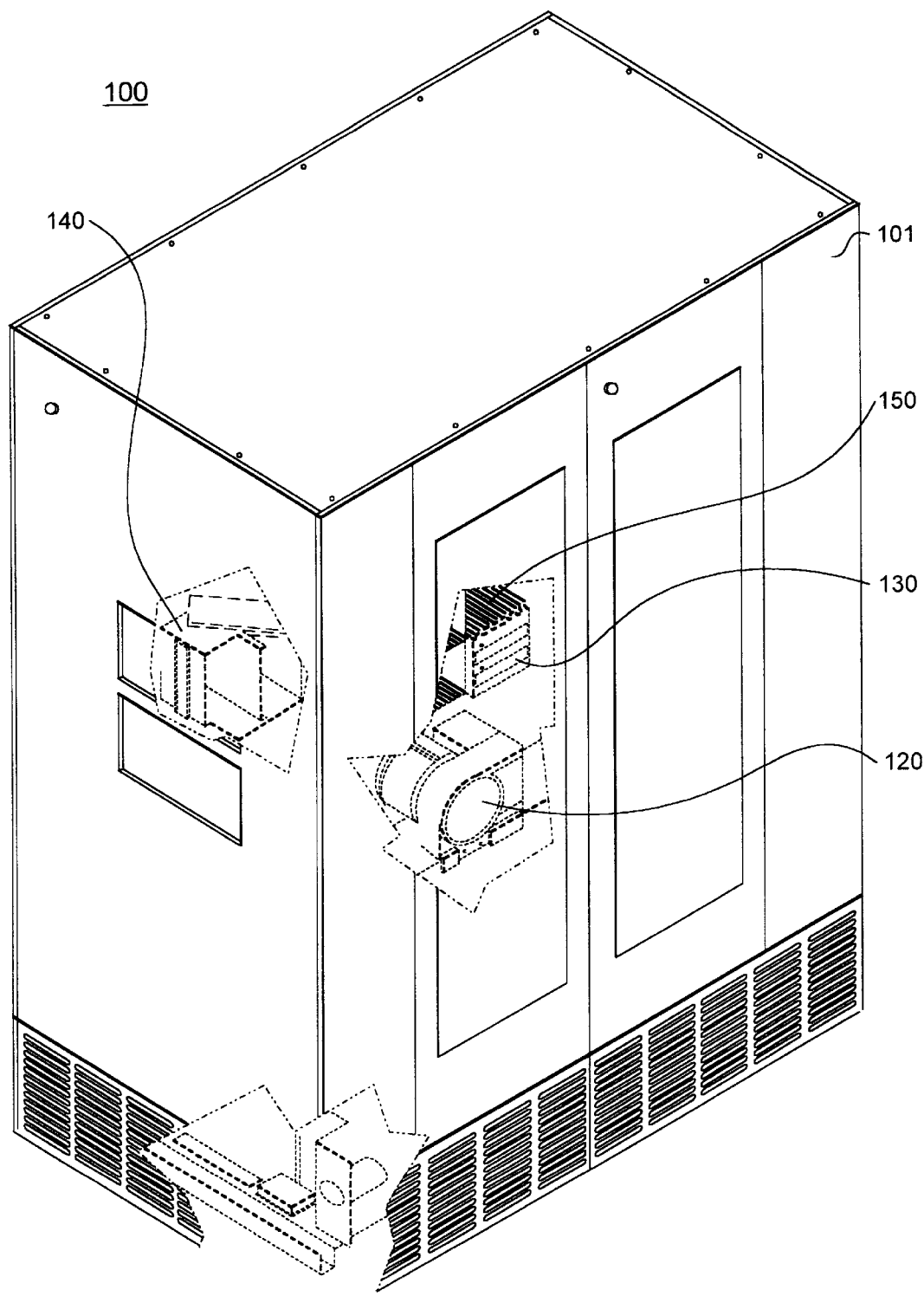
FIG. 1B shows an isometric view of one embodiment of a data jukebox of the present invention.

FIG. 1B shows an isometric view of one embodiment of data jukebox 100, with picker 120, drives 130, mailbox 140, and slots 150 all contained within a housing 101.

Picker 120 physically moves media between slots 150 and drives 130. Picker 120 may include one or more sets of grippers which are capable of grasping the media. Picker 120 is capable of rotating media to any position required for drives 130 or slots 150. Picker 120 may be capable of handling bare media, such as CD-ROM or DVD, or media in a cartridge, such as a magneto-optical cartridge or DVD-RAM. Picker 120 is physically moved between drives 130 and slots 150 in jukebox 100 by a set of positioning motors.

Drives 130 read and may write to the media. Drives 130 may be mixed within the same jukebox 100 to handle more than one type of media.

Mailbox 140 exchanges media between the slots 150 and the outside world. Mailbox 140 may include a slot on the exterior of jukebox 100 which allow a user to insert and remove media. When mailbox 140 accepts media, mailbox 140 may physically move the media into an intermediate location accessible to picker 120. Picker 120 may then move the media into a suitable slot 150 or drive 130.

Slots 150 store the media in fixed locations to permit access by picker 120. Slots 150 are configured to fit the media being stored, and may be mixed to store more than one type of media within the same jukebox 100.

Jukebox 100 may also include other subsystems 160 which are connected to control network 116. Other subsystems 160 may include an intelligent power supply, a barcode reader, and intelligent sensor modules. An intelligent power supply would be capable of intelligent power management. A barcode reader would be connected to control network 116 and be capable of performing media label inventory on a large jukebox 100 in a short period of time. Intelligent sensor modules may be used to detect over-temperature conditions within the jukebox enclosure or to detect cooling fan failure and other vital operating conditions.

The very nature of the distributed control architecture of the present invention lends itself to the construction of large systems that by necessity must locate control functions at physically remote locations. The networked control system allows elimination of long, noise-generating and noise-susceptible cables which would have to be run great distances in current automated data storage library control architectures.

New network interfaces are easy to define and implement, making the system logically extensible without bound. The only requirements for adding a new network interface is to create the specification for the new function, define the interface to meet the minimal requirements, and modify the CCU software to support the new feature.

This distributed control architecture, and this particular implementation, provide for the ability to control multiple libraries from a single CCU. Libraries may therefore be logically connected, but physically separate, providing greater flexibility in the use of computer room floor space.

2. Picker

Figure 2:
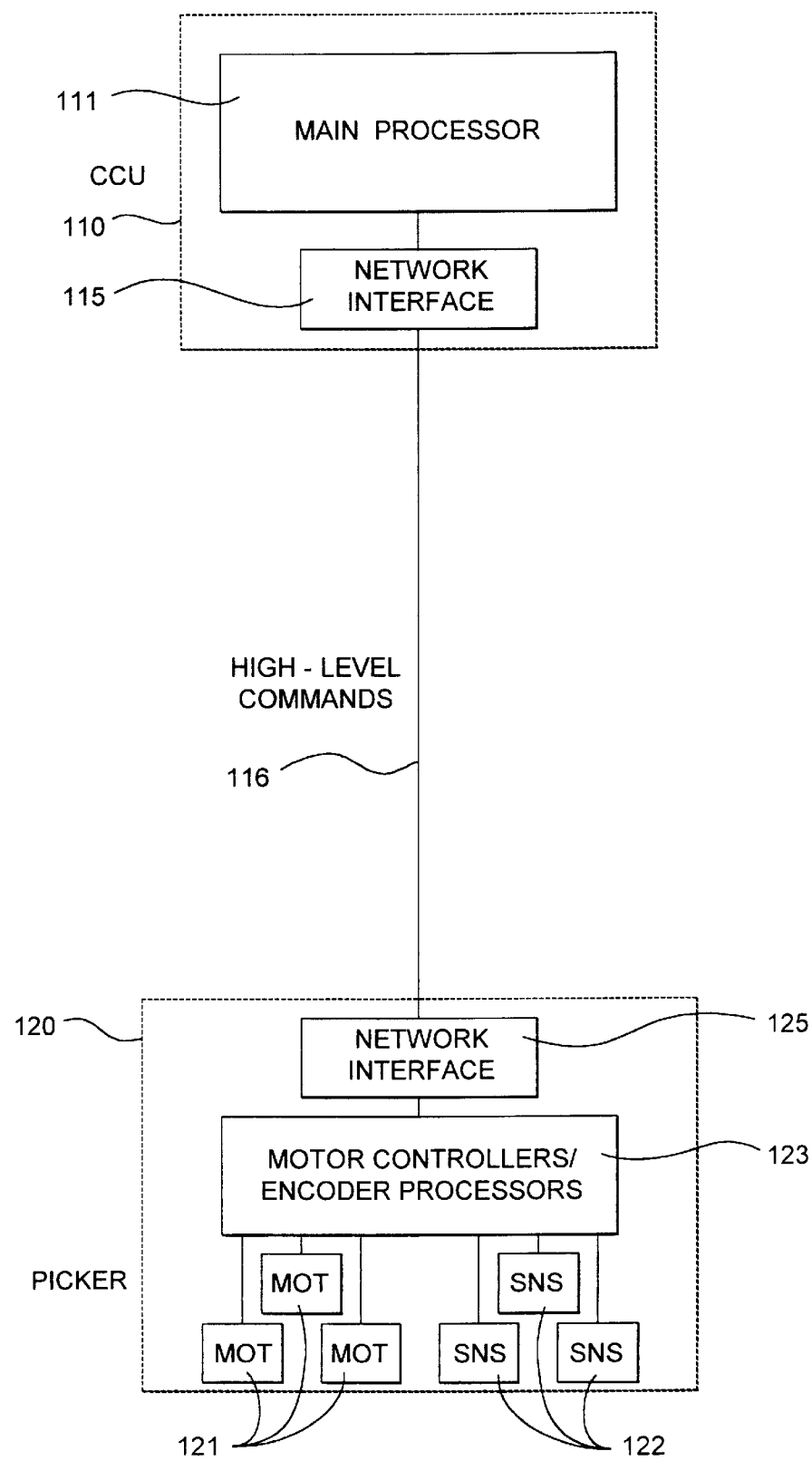
FIG. 2 shows a schematic view of one embodiment of a picker of the present invention.

FIG. 2 shows a schematic view of one embodiment of a picker 120 of the present invention. Picker 120 includes one or more motors 121, one or more sensors 122, motor controllers 123, and a picker network interface 125. Motor controllers 123 and picker network interface 125 may be located on the same printed circuit board.

Picker 120 includes one or more grippers which allow picker to physically handle media. Motors 121 are coupled to grippers and allow picker 120 to physically exchange media with the slots and drives of jukebox 100. Picker 120 may be capable of handling more than one piece of media at a time. For example, picker 120 may have two grippers and three motors 121: one motor 121 for each of the two grippers to extend and retract the grippers, and one motor 121 to rotate the grippers. Motors 121 may be stepper motors, servo motors, solenoids, or any other suitable actuator. Sensors 122 provide feedback from motors 121. For example, sensors 122 may include limit switches which define the maximum travel of the grippers. Sensors 122 may also include optical detectors which indicate the presence of media in the grippers. Sensors 122 may also include current-limit detectors to prevent motor burnout in stalled conditions. Media in picker 120 may be held in place with guide slots to prevent movement out of the correct position during insertion, retraction, and rotation.

Motor controllers 123 are located on picker 100 and connected to motors 121 and sensors 122. For example, motor controllers 123 may be Model No. LM628 or LM629 available from National Semiconductor, Inc. Sensors 122 may be encoders located on each motor 121 which provide position feedback to an encoder processor connected to motor controller 123. For example, the motor controller on the LM628/629 generates a signal proportional to the position error received from the encoder processor, which is fed into a motor amplifier such as Model No. LMD18200 manufactured by National Semiconductor, Inc., or Model No. 4212 manufactured by Copley Controls Inc. The motor amplifier receives the control signal from the LM628/629 and produces the required current to drive motor 121 to the desired position.

Picker network interface 125 is located on picker 100 and is capable of receiving high-level commands from CCU 110 over control network 116 and transforming them into low-level commands that can be used by motor controllers 123. Picker network interface 125 may include an application processor, an I/O processor, and/or a network processor. The application processor is used to execute the specific functions required by a subsystem. For instance, the functions required for a motor control subsystem are different than those for a drive control subsystem, therefore the application executed by the application processor would be very different. The I/O processor is used to read and/or change the binary state of a number of control lines. These control lines can be used for reading optical or other sensors for turning on and off control signals such as for the operation of a solenoid or LED. The network processor is for providing access to the network media and for executing the network protocol. The network protocol may be IP (Internet Protocol), Lonworks™ protocol, FTP (File Transfer Protocol), or any other suitable network protocol.

Different physical implementations of the robotics mechanisms used in picker 100 can easily be supported by this distributed control system. By simple modification of the configuration script, the system can readily adapt to fewer or more axes of movement, differences in the maximum distance each axis is capable of moving, and many other variations in features and capabilities.

3. Drives

Figure 3:
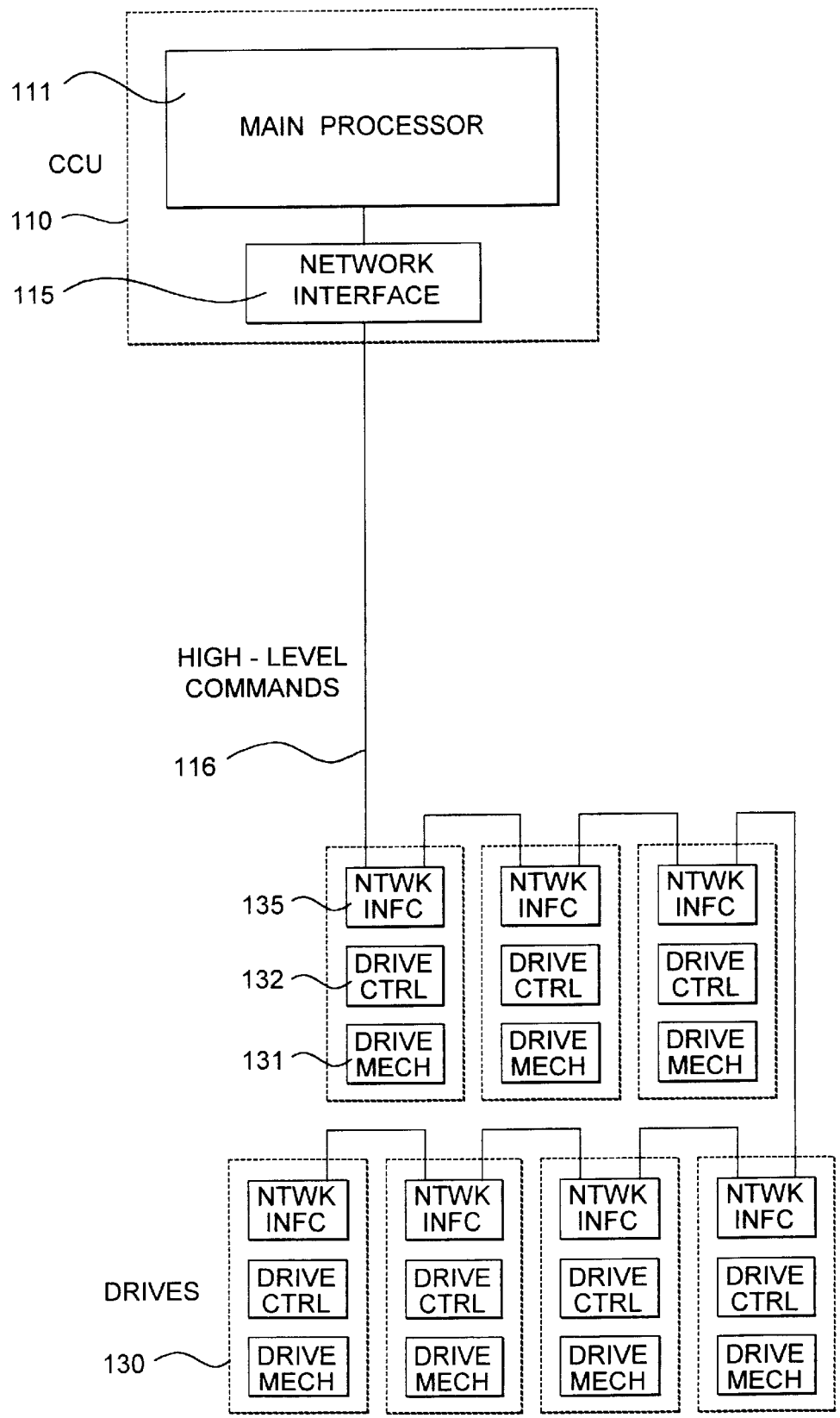
FIG. 3 shows a schematic view of one embodiment of a drive configuration of the present invention.

FIG. 3 shows a schematic view of one embodiment of a drive 130 of the present invention. Drive 130 includes a drive mechanism 131, a drive controller 132, and a drive network interface 135.

Drive mechanism 131 actually receives the media and reads the media. Drive mechanism 131 may be magneto-optical, CD-ROM, CD-RW, magnetic tape, or any other suitable format or mix of formats. For example, drive mechanism 131 may be a Sony SMO F551 magneto-optical drive with a 5.2 GB capacity, a Sony CDU 948 CD-ROM drive with a 650 MB capacity, a Panasonic LF-D101U DVD-RAM drive with a 4.7 GB capacity, a Sony SDX-300 AIT tape drive with a 50 GB capacity, or a Quantum DLT4000 or DLT7000 digital linear tape drive with a capacity of 20–70 GB. Drive mechanism 131 may also be a hot-swappable drive bay for use with media such as complete hard drive assemblies.

Drive controller 132 controls the behavior of drive mechanism 131. Drive controller 132 may consist of a single board which provides the network interface and the controls necessary for a single drive 130, as well as one or more interface connectors which can be used to connect to one or more additional drive controllers 132 for controlling the functions of other drives 130.

Each drive controller 132 may contain a voltage converter and power supply to provide the power for drive 130 it controls. The input to this power converter may be controlled by a switching circuit which is under the control of the I/O processor on the board for the purpose of turning the power supply on and off as required.

Each drive controller 132 may also include several I/O lines. Some of these I/O lines may be used for setting the drive identification number, such as SCSI (Small Computer Systems Interface) identification number in the case of SCSI drives. Other I/O lines may be used to drive a visual display, such as a seven-segment LED display, for the purpose of displaying the drive identification number. Each drive controller 132 may also have a circuit for driving a solenoid which controls an interposer mechanism for preventing the accidental ejection of media into the path of moving library robotics. Some I/O lines may also be used to control the ejection of media from drives 130 and to read drive full/empty status.

Drive controller 132 supports many or all of the functions necessary for the operation or enhancement of operation of drives 130 in a library environment. Drive controller 132 may be capable of setting the bus identification address for each drive, such as SCSI identification for SCSI drives, and displaying that identification information on a visual display such as a seven-segment LED. Drive controller 132 may also be capable of controlling the eject of media from a drive 130. Drive controller 132 may also be capable of controlling a solenoid-actuated interposer mechanism for preventing the accidental ejection of media into the path of the moving library robotics. Drive controller 132 may also be capable of determining the state of a drive 130, i.e. either full or empty and relaying that information back to CCU 110. Drive controller 132 may also be capable of controlling the power to any attached drive 130 for the purpose of powering multiple drives 130 in sequence to prevent excessive drain of the main power supply during power-on cycling. Drive controller 132 may also be capable of resetting drives 130 after some state change.

Drive network interface 135 is capable of receiving high-level commands from CCU 110 over control network 116 and transforming them into low-level commands that can be used by drive controller 132. Drive network interface 135 may include an application processor, an I/O processor, and/or a network processor, each of which may be similar in function to those found in the network interface described above.

Drive network interface 135 may allow each drive 130 to be configured from a central location, such as the host or mailbox 140. For example, drive network interface 135 allows the SCSI identification number for each drive 130 to be configured via software, instead of requiring that each individual drive 130 be physically accessed to set the SCSI ID. Drive network interface 135 may also allow each drive 130 to be individually powered on and off, such as for configuration or diagnostic purposes.

Although drives 130 are shown connected in a daisy chain configuration, drives 130 may be connected in any network configuration supported by drive network interfaces 135. For example, Lonworks™ permits a free topology, and would allow drives 130 to be networked in a star, ring, or any other suitable configuration.

By reconfiguring or reprogramming drive network interfaces 135 for drives 130, new drive types can readily be accommodated. This extends even to drives 130 that have radically different media characteristics, such as the differences between optical disks and magnetic tapes. Variations in physical and logical drive interfaces can be completely masked by drive network interfaces 135.

4. Mailbox

Figure 4:
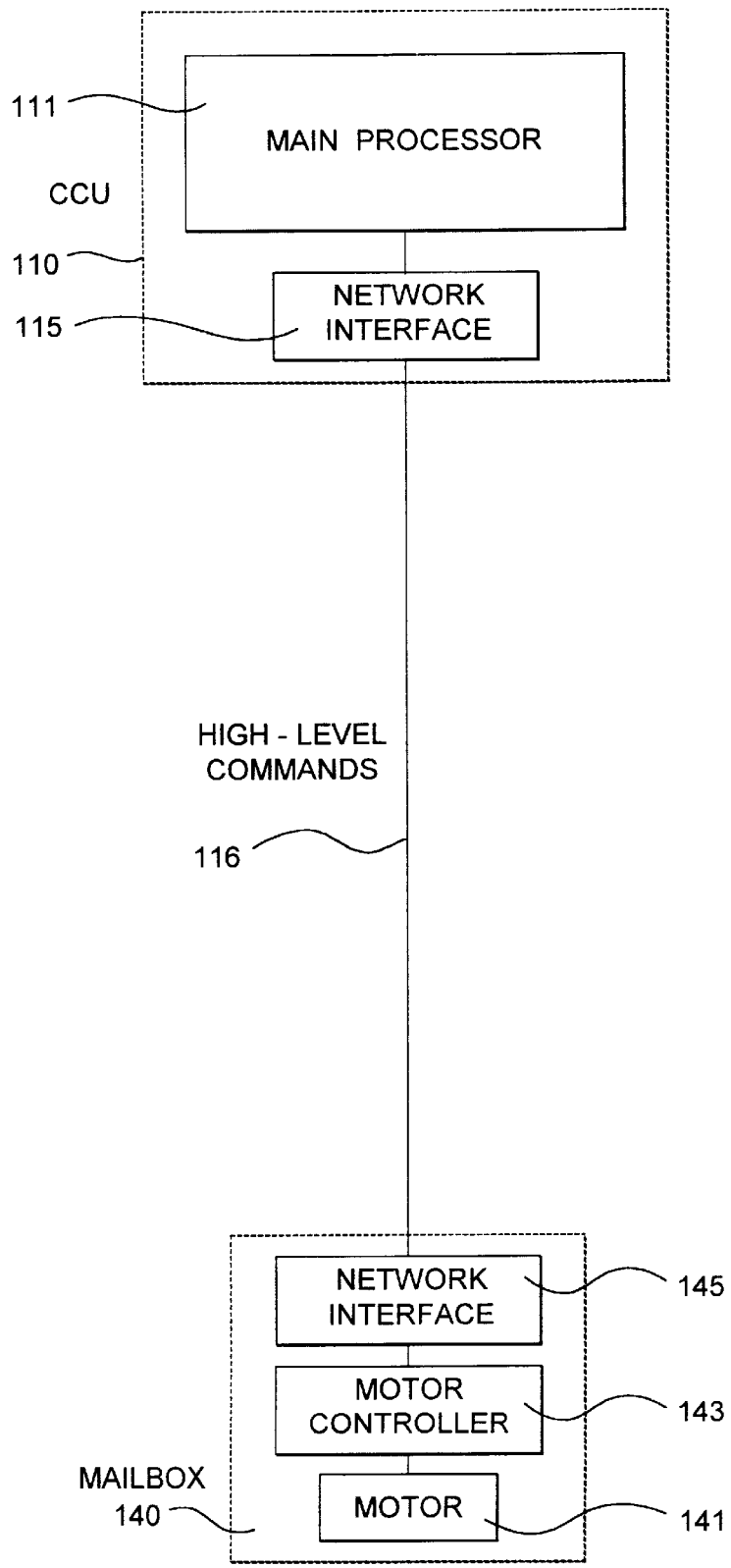
FIG. 4 shows a schematic view of one embodiment of a mailbox of the present invention.

FIG. 4 shows a schematic view of one embodiment of a mailbox 140 of the present invention. Mailbox 140 includes one or more motors 141, one or more sensors 142, motor controller 143, and a network interface 145.

Motor controller 143 receives high-level commands through network interface 145. These commands may be to request motor controller 143 to find the first or second home sensor. This motor movement will cause motor controller 143 to move media to a position either inside jukebox 100, where it can be accessed by the library robotics such as picker 120, or outside jukebox 100 where it can be accessed by a human operator. Other sensors 142 may detect the presence of media in the mailbox tray or to detect the presence of an obstruction in the exterior mailslot.

5. Power System and Controller

The bulk power input for a distributed power system may be a multiple module, single output switching supply powered from a standard AC single phase outlet. The input may be power factor corrected and auto voltage selectable. The supply system may be a single frame capable of holding multiple modules in an N+1 configuration. The modules may be warm pluggable and may be replaced while jukebox 100 remains online. Each module may current share with the other modules in the system, spreading the load evenly over all modules. Each supply module may provide its own forced air for cooling.

Primary AC line power may enter jukebox 100 through a fixed line cord to a breaker which may serve as the main shut off for jukebox 100. The AC may then pass through a line filter and directly to the main power chassis serving one or more sides of jukebox 100. All components of jukebox 100 may be powered from the DC output of the power system.

A jukebox frame, whether single- or double-sided, may have a single power chassis in the base. This chassis may support multiple power modules, each of which may provide the conversion of input AC into a regulated single voltage selected for distribution throughout the system. This multiple power module design provides redundancy and expandability, without requiring 2N modules, or a pair of modules for each separate voltage. For example, the distribution voltage may be 48 volts. Each side may have its own DC shut off such that each side of a double-sided jukebox 100 may still be turned on and off independently while still using only one AC power system.

The power distribution system may use one or more distribution points depending on the configuration of jukebox 100. For example, a double-sided or duplex configuration would have two distribution points. Each distribution point feeds a set of subsystems, including pickers, mailboxes, motors, and drives. Each subsystem is then responsible for converting the 48 V provided to it into whatever voltages the particular subsystem requires.

A power controller may be used to control power distribution within jukebox 100. The power controller includes a power control network interface and is connected to control network 116. One or more bulk power modules may be mounted in jukebox 100 to convert standard AC input power to 48 VDC power. The 48V power may be routed initially to the power controller and then distributed throughout jukebox 100 using simple, low cost wiring. This distributed power can vary substantially from the nominal 48V and need not be tightly regulated, which further reduces power system costs.

From the power controller, 48V power may be routed to each of the networked subsystems in the library, such as picker 120, drives 130, mailbox 140 and their various motor controllers. Each networked subsystem may be equipped to convert the raw 48V to whatever voltages are required to operate the devices at the subsystem.

6. Barcode Module

Figure 5C:
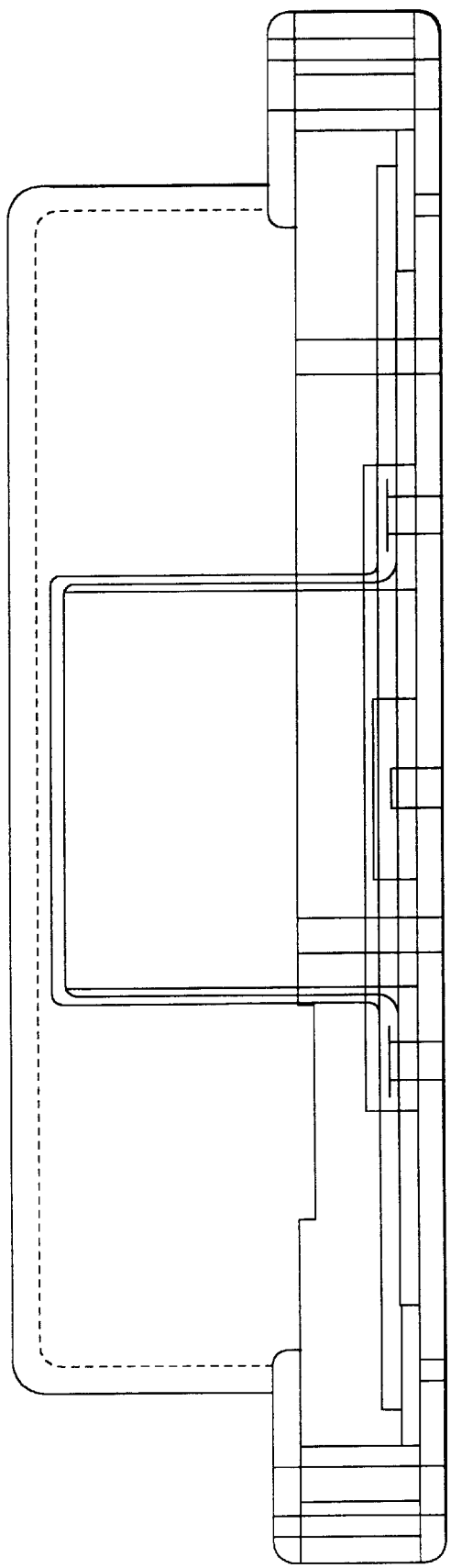

FIGS. 5A–5C show top, side, and end views, respectively, of one embodiment of a barcode module 160 of the present invention suitable for use with automated data storage libraries such as data jukebox 100. Barcode module 160 has physical features which allows barcode module 160 to be grasped and otherwise manipulated by picker 120, as shown in FIG. 5A. For example, barcode module 160 has a housing 161 which may include notches 162 similar to those found on an end of a magneto-optical cartridge 170 used by the grippers of picker 120 to manipulate the cartridge. Barcode module 160 may be stored in its space, or barcode module 160 may have physical features which allow barcode module 160 to be stored in one or more slots 150 used to store media. Barcode module 160 may thus be stowed when not in use, minimizing exposure to vibration and other handling which would otherwise reduce the useful life of barcode module 160.

In one embodiment, barcode module 160 has exterior dimensions identical to a piece of media. In another embodiment, barcode module 160 has exterior dimensions identical to a piece of media only at the end to be manipulated by picker 120.

Barcode module 160 includes a barcode reader 163 which allows CCU 110 and/or host 119 to perform rapid inventory of the media in slots 150 by reading barcodes found on each piece of media. For example, when inventory of data jukebox 100 is desired, picker 120 may grasp barcode module 160 and run barcode module 160 along the rows of slots 150 in data jukebox such that barcode reader 163 can read barcodes 171 located on the exposed end of each magneto-optical cartridge 170. This may eliminate the need to grasp each piece of media from slot 150, insert it into a drive 130, perform the inventory, and return the media to slot 150. Barcode reader 163 may have a broad effective read range, thus minimizing the need to precisely place barcode module 160 relative to barcodes 171.

Barcode module 160 may include contacts 164 which electrically connect to a matching set of contacts 166 that may be found on picker 120. Barcode module 160 may be powered through contacts 164, one or more batteries located on barcode module 160, or a combination of power sources.

Barcode module 160 may communicate data with CCU 110 or host 119 through contacts 164. Barcode module 160 may store inventory information in a memory device for later download, or it may communicate inventory information in real-time to CCU 110 and/or host 119 through contacts 164 and 166.

Barcode module 160 may include a printed circuit board 167 or other electronics necessary to the function of barcode module 160. Barcode module 160 may include a barcode module network interface 165. Barcode module network interface 165 is capable of exchanging packetized information with CCU 110 over control network 116. Barcode module network interface 165 may include an application processor, an I/O processor, and/or a network processor, each of which may be similar in function to those found in the network interface described above.

Barcode module 160 may not be limited to reading only barcodes; different readers optical or otherwise capable of reading other forms of identification, such as optical character recognition to read serial numbers or a magnetic reader to read magnetic strips, may be used.

Barcode module 160 permits easy maintenance of data jukebox 100 by eliminating the need to disassemble picker 120 in order to perform maintenance or repair. Maintenance and repair can be achieved by simply replacing barcode module 160 itself, thus greatly simplifying field servicing and even permitting user servicing of data jukebox 100. Furthermore, barcode module 160 allows existing jukeboxes to be easily retrofitted with barcode reading capabilities.

Figure 5D:
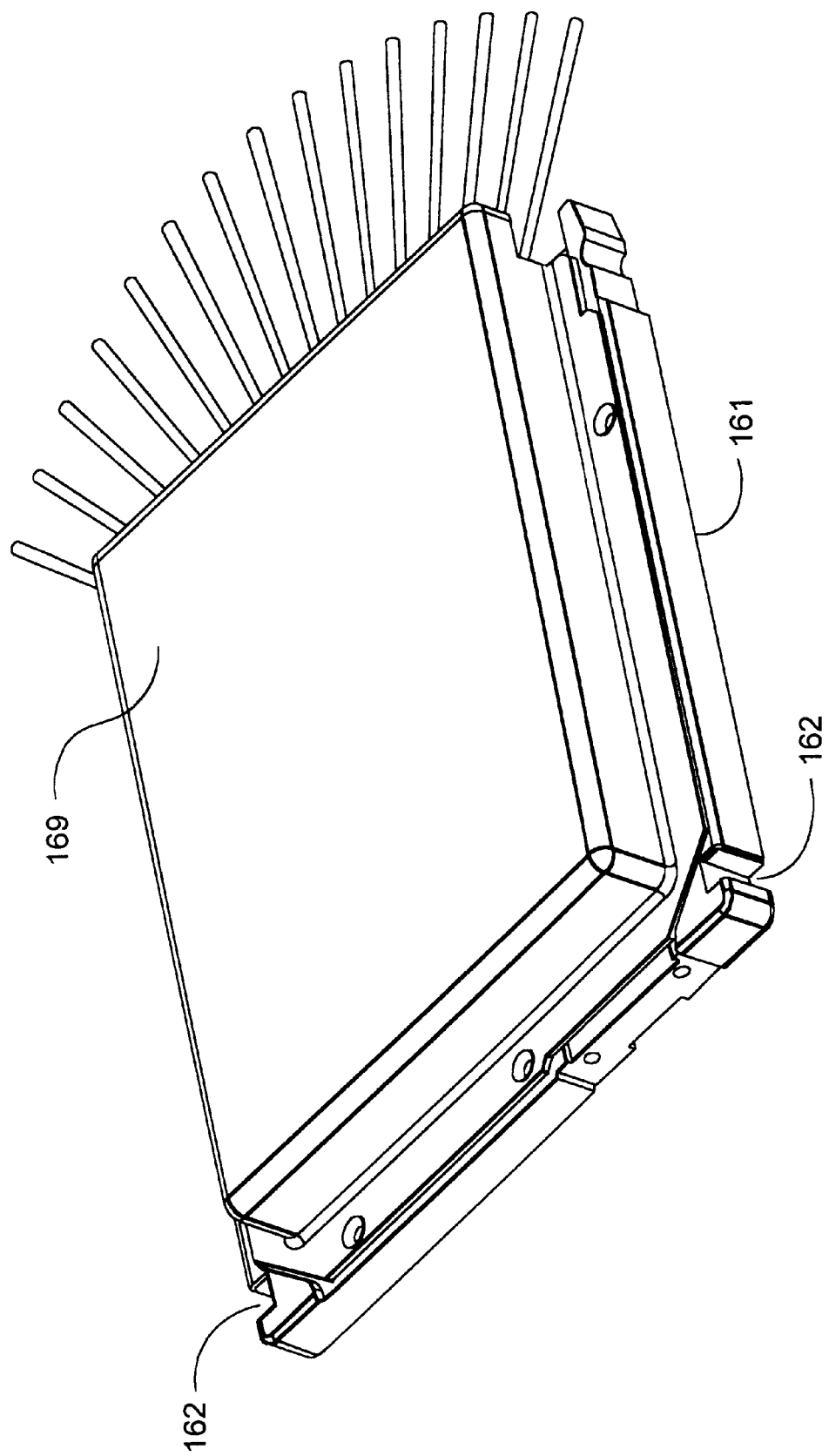
FIGS. 5D–5E show isometric views of one embodiment of a barcode module of the present invention.
Figure 5E:
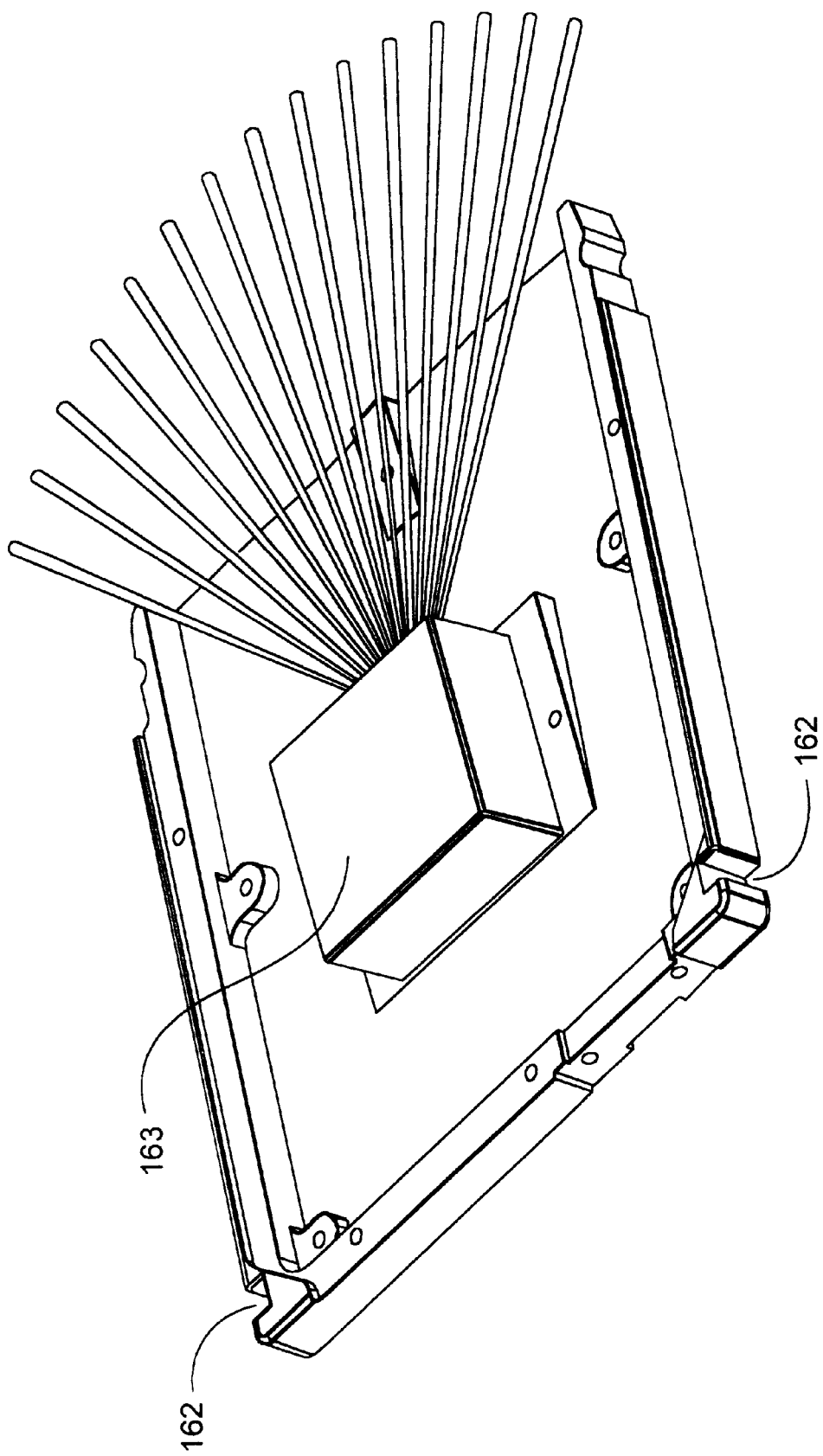

FIGS. 5D–5E show isometric views of one embodiment of a barcode module 160 with and without a cover 169, respectively.

The foregoing description of the invention has been presented for purposes of illustration and description. It is not intended to be exhaustive or to limit the invention to the precise forms disclosed. Many modifications and variations will be apparent. It is intended that the scope of the invention be defined by the following claims and their equivalents.

What is claimed is:

1. An optical reader module for a data jukebox, comprising:
   a housing capable of being manipulated by a picker;
   a plurality of contacts configured to mate with a matching set of contacts on the picker; and
   an optical reader device coupled to the housing, the optical reader capable of reading identification tags on media cartridges to allow inventory of media cartridges in the data jukebox.

2. The optical reader module of claim 1, wherein the contacts provide power to the optical reader module.

3. The optical reader module of claim 1, wherein the contacts allow the optical reader module to exchange information with a central control unit.

4. A barcode module for a data jukebox, comprising:
   a housing capable of being manipulated by a picker;
   a plurality of contacts configured to mate with a matching set of contacts on the picker; and
   a barcode reader coupled to the housing, the barcode reader capable of reading barcodes found on media cartridges to allow inventory of media cartridges in the data jukebox.

5. The barcode module of claim 4, wherein the contacts provide power to the barcode module.

6. The barcode module of claim 4, wherein the contacts allow the barcode module to exchange information with a central control unit.

* * * * *